(No Model.)
2 Sheets—Sheet 1.
R. D. TOMLINSON.
DAMPER REGULATOR FOR STEAM BOILERS.
No. 515,030.
Patented Feb. 20, 1894.
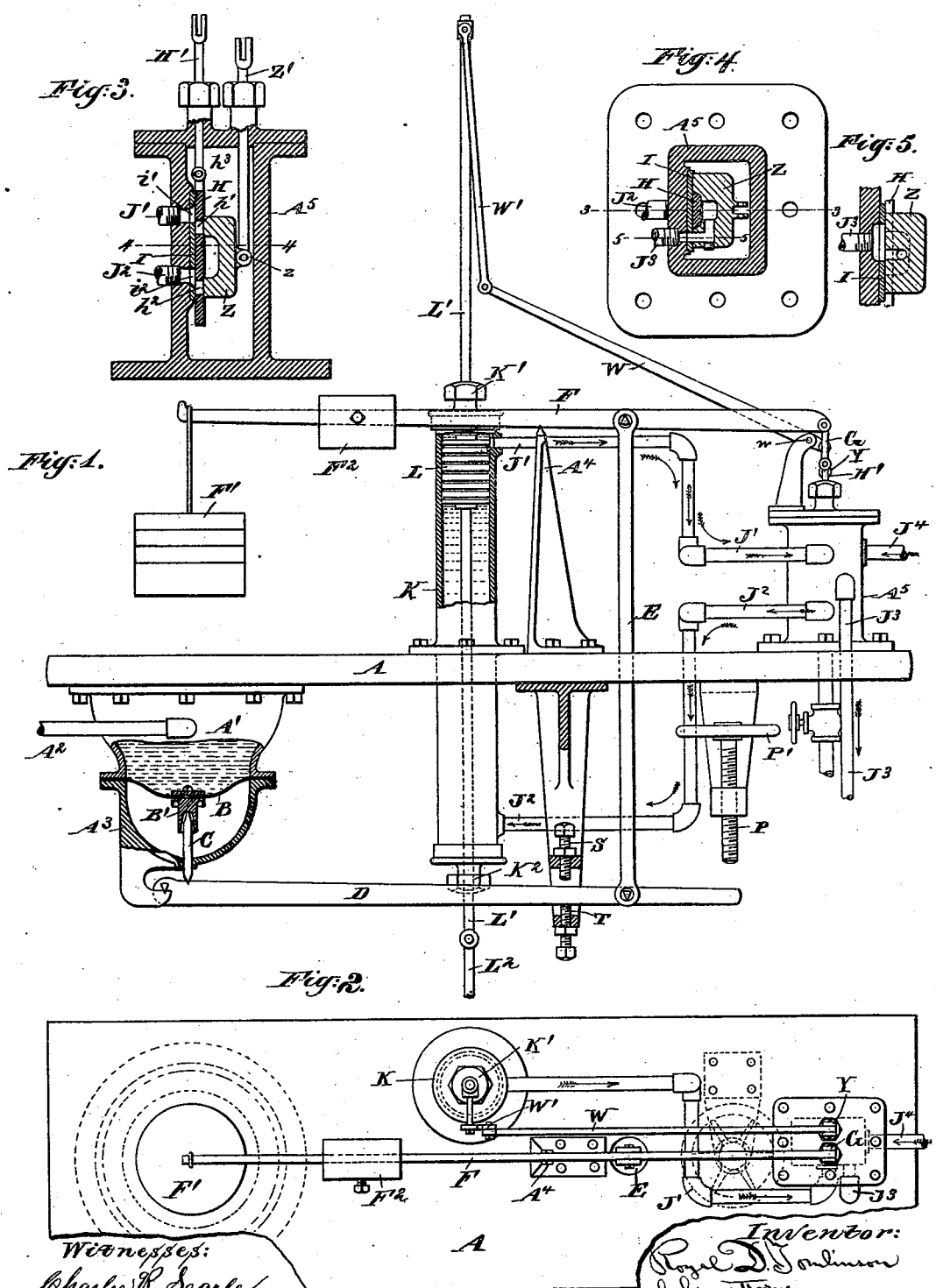

(No Model.) 2 Sheets—Sheet 2.
R. D. TOMLINSON.
DAMPER REGULATOR FOR STEAM BOILERS.
No. 515,030. Patented Feb. 20, 1894.
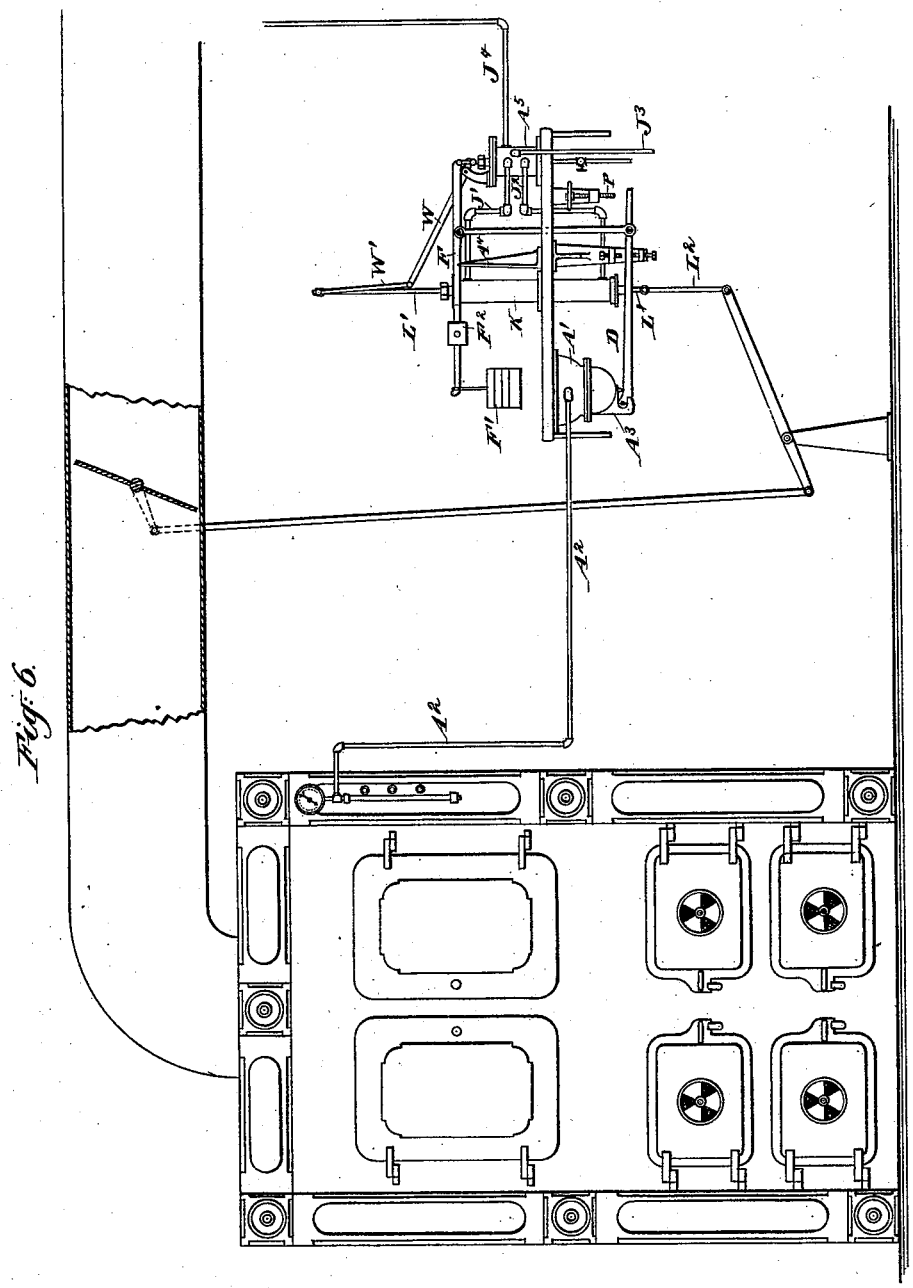
Witnesses:
Charles R. Searle.
Geo. L. Eastman,
Inventor:
Royal D. Tomlinson
by his attorney
Thomas Drew Stetson

UNITED STATES PATENT OFFICE.

ROYAL D. TOMLINSON, OF NEW YORK, N. Y.

DAMPER-REGULATOR FOR STEAM-BOILERS.

SPECIFICATION forming part of Letters Patent No. 515,030, dated February 20, 1894.

Application filed June 19, 1893. Serial No. 478,051. (No model.)

*To all whom it may concern:*

Be it known that I, ROYAL D. TOMLINSON, formerly of Danbury, Fairfield county, in the State of Connecticut, now doing business in the city and county of New York, in the State of New York, have invented a certain new and useful Improvement in Damper-Regulators for Steam-Boilers, of which the following is a specification.
My damper regulator works automatically by the variations in the pressure of the steam, in a manner which has been long known and approved,—receiving the pressure of the steam on a diaphragm, which diaphragm is urged in the opposite direction by a constant force. When the pressure of the steam in the boiler exceeds the required amount it will move the diaphragm more or less and induce a corresponding movement of a connected valve which will allow water under a sufficient force to be admitted to one side and discharged from the other side of a separate piston, which latter piston is connected to the damper, and shifts it into a wider-open position, thus giving more draft to the fire and quickening the generation of steam. When, on the contrary, the pressure in the boiler sinks below the required standard, it proportionally relaxes its pressure on the diaphragm and the constant force overcomes it, and a movement of the diaphragm in opposition to the pressure of the steam, shifts the valve in the opposite direction, and induces an action of the water on the piston in the reverse direction, admitting it on the side where it was before discharged, and discharging it on the side where it was before admitted. These conditions induce a movement of the piston in the opposite direction, and cause the damper to partially close, thus checking the fire and reducing the production of steam.

The improved regulator also possesses another quality which has been before known,—
that of arresting the action of the water and consequently of the piston which is connected to the damper in a brief period after the motion has been initiated by the diaphragm. My apparatus thus attains the important end of shifting the piston and consequently the damper to only a small extent for small variations of pressure of the steam, and then arresting the change without waiting for the new position of the damper to affect the intensity of the fire and through it to change the pressure of the steam.

My regulator also attains another feature,— that of holding the damper in its new position; that is to say more or less opened or closed, so conditioned that it is ready to be moved farther in the same direction, or to be moved in the opposite direction by subsequent changes in the pressure of the steam.

The features thus far described have been before known.

My improved regulator is (like others of its class) capable of adjusting the damper with exactness and promptness, so that with ordinary regularity in the use of the steam and ordinary regularity in the firing, the steam-pressure will be kept practically uniform. But all the damper regulators heretofore known to me, containing these features, have been subject to difficulties which my invention avoids. I employ two movable valves, one, the smaller, connected to the diaphragm, receives motion therefrom, and initiates the action whenever the pressure of the steam varies; the other, larger, and partially inclosing the first, is connected to the piston, and moves therewith. This larger valve follows the movements of the smaller valve in either direction, and when it has quite overtaken it, the action stops, and the damper is held reliably in the position in which it has been, then, automatically adjusted. I employ two levers, a double lever, connected by a link, and thus obtain the desired movement of the small valve from a much less movement of the diaphragm, while keeping the horizontal dimensions of the device within a small compass. I arrange the diaphragm to be pressed downward instead of upward, thus making it easier to insure that water and never steam shall come in contact with the diaphragm. I connect the passages for the ends of the cylinder near each end and provide a plain and simply constructed piston adapted to perform the single function of receiving the action of the water admitted and discharged through those end passages and transmitting it effectively to the damper. And, what I have found to be of great importance, I arrange the valves so that they are free to yield, and cannot become clogged by foreign substances in the water.

In case any foreign hard material accidentally present shall become caught in the space between one of my valves and the other, or between either valve and the seat or face on which it slides, my valve can readily yield or be raised from its seat to any extent required to overcome or avoid any small obstacle without deranging the action. I provide for a sufficient escape of water leaking through the space between the valves or between either valve and its seat under such conditions.

The accompanying drawings form a part of this specification and represent what I consider the best means of carrying out the invention.

Figure 1 is a side elevation partly in vertical section. Fig. 2 is a corresponding plan view. The remaining figures represent details detached on a somewhat larger scale. Fig. 3 is a vertical section through the valve and the inclosing casing on the line 3—3 in Fig. 4. Fig. 4 is a horizontal section on the line 4—4 in Fig. 3. Fig. 5 is a vertical section on the line 5—5 in Fig. 4. Fig. 6 is an elevation corresponding to Fig. 1 but on a smaller scale with a vertical section of the damper and flue and an elevation of the boiler front.

Similar letters of reference indicate corresponding parts in all the figures where they appear.

A is a stationary horizontal plank or platform of hard wood or other suitable material, on which the several parts are supported.

A' is a box of cast iron or other suitable material, bolted on the under side of the platform A, and receiving steam from the boiler, not represented, through a pipe $A^2$. A flexible diaphragm B of soft rubber or other suitable material, extends across the considerable circular area at the bottom, and is clamped tightly around the edges by the casing $A^3$, an extension of which supports the knife-edges of a horizontal lever D, to which the force acting on the diaphragm is transmitted through the casting B' and link C. The steam admitted through the pipe $A^2$ condenses into water in the box A', and presses downward on the diaphragm B with the variable force due to the fluctuations in the pressure in the boiler. The lever D is connected by a link E to a lever F, which turns on a sufficiently stout fulcrum $A^4$ extending upward from the platform, and carries on the opposite arm adjustable weights F', $F^2$, the gravity of which, acting through the lever F, link E, lever D, link C and casting B', exerts a constant lifting force on the diaphragm D in opposition to the force exerted by the pressure of the steam. An extension of the lever F farther to the right, carries, by means of a link G, and valve-stem H', a flat slide-valve H, which is adapted to slide up and down under a larger slide Z in a valve-casing $A^5$ subject to a strong pressure of water, as will be described farther on. The slide H is perforated at two points h' $h^2$ and is adapted to slide tightly on a plane face I, the latter having also two perforations i', $i^2$ connected by pipes J', $J^2$, with the upper and lower ends respectively of a vertical cylinder K, which latter is rigidly supported on the platform A, and incloses a piston L, the piston rod L' of which extends out through stuffing boxes K', $K^2$ at the upper and lower ends of the cylinder. The lower end of this rod is connected by a knuckle joint to a link $L^2$, which extends downward to an arm of the damper, not shown. The damper may be any of the approved forms. I will assume that it is the most common form, simply a plane plate of iron or other suitable material turning on a central horizontal axis in the chimney which conveys away the gaseous products of combustion from the furnace, and adapted to arrest the passage of such gases more or less as it is turned in one direction or the other. With such construction the link $L^2$ is simply knuckled to an arm keyed on the extended end of the shaft of the damper. When the boiler pressure on the water lying on the upper face of the diaphragm B overcomes the gravity of the weights F', $F^2$, and depresses the diaphragm, it moves the slide valve H downward and displaces the apertures h', $h^2$, bringing the first partially into the throat of the valve Z, allowing water to escape therethrough from the upper end of the cylinder K flowing through the pipe J', and out and away through the pipe $J^3$ in the directions indicated by the arrows. The same movement also displaces the aperture $h^2$, carrying it outside of the valve Z, and making thereby a passage for the water which fills the valve-casing $A^5$ under pressure, being received from an elevated tank or street main through a pipe or passage $J^4$ allowing it to flow into the bottom of the cylinder K, such water flowing through the pipe $J^2$ in the direction indicated by the arrows, and exerting a strong force to lift the piston L and correspondingly move the piston rod L' and partially close the connected damper, not shown. I provide for arresting this movement when it has proceeded a sufficient distance, by means of a link W' pivoted to the top of the piston-rod L' and connecting to a lever W turning on a fixed center $w$ and connecting by a link Y to a valve stem Z', which connects to the valve Z. As soon as the sinking of the diaphragm B has tilted the lever F and depressed the valve H and set the water in motion in the directions indicated by the arrows, and the piston L commences to rise, the motion is communicated through the lever W and its connections to the valve Z, and this valve is depressed. This valve is by the continuance of this motion depressed so far as to completely cover the apertures h', $h^2$, in the slide H, and when this condition is attained, the parts again come to rest. Another movement of the diaphragm B, which we will suppose to be in the opposite direction, will induce a corresponding movement of the slide H upward, and this, through the transmission of water through the pipes $J'$, $J^2$, in the directions the reverse of those indicated by the arrows, will move the piston L strongly downward and correspondingly open the damper. If the movement of the diaphragm is, on the contrary, in the same direction as at first, downward to a greater extent than before, it will induce a corresponding increased extent of movement of the slide H downward, with the effect to again send the water in the direction indicated by the arrows, and to again lift the piston L and further close the damper. In this case the upward movement of the piston gives a corresponding further inclination of the lever W and a corresponding further depression to the slide Z. In whichever direction the perforated slide H moves, it is followed by the larger and covering slide Z. The water in the valve-casing $A^5$ is under a constant high pressure received through the pipe $J^4$. This pressure holds the valve Z tightly to its seat; the friction thus induced is of no consequence, because there is ample power in the strong movement of the piston L transmitted through the lever W to compel the movement of this valve. The small slide H is largely covered by the slide Z, which is grooved longitudinally to accommodate it, allowing it to protrude above and below as plainly shown in the figures. It makes a tight and easy contact with these surfaces. All that portion which is covered by the hollow throat of the valve Z is subject to no pressure. The portions which are covered by the bearing surfaces of the valve Z, are mainly the apertures $h'$, $h^2$. The portion which protrudes entirely beyond the bearing at the bottom and top, as shown in Fig. 3, is balanced. There remains a gentle unbalanced lateral pressure on this slide H, holding it in water-tight contact with the plane glass face I which serves as a seat. The friction thus induced is a retarding force tending to obstruct the free movement of the diaphragm B and its connected train of mechanism, but the resistance from this cause is slight and is not objectionable. I derive an important advantage from the arrangement of these slides H and Z, in the manner shown, in the fact that they can each leave their seats either temporarily, to ride over a bit of wood or other solid matter, which may be received with the water, or permanently to ride over any thin scale which may form on the surfaces. With some waters there is a tendency to coat materials with a hard crust which tends to arrest the action of the apparatus and to require a skillful overhauling and cleaning at intervals. My arrangement reduces the difficulty by allowing the slides H and Z to move bodily away from the valve seat I, this motion being accommodated by the springing of the long valve stems, and also by a small amount of looseness which I provide in the eyes $h^3$ and $z$ by making the holes oblong horizontally, as indicated in Fig. 3. I reduce the friction of the slides H and Z on the seat I and also reduce the liability to the formation of scale on such seat by making the seat, as already stated, of glass. This is effected by introducing in the seat plate glass, having two holes coinciding with the junctions of the pipes $J'$, $J^2$, as plainly shown in Figs. 3, 4 and 5, the glass being sunk into a sufficient recess to allow its outer face to serve as the surface on which the slide shall act. The glass is rigidly and tightly held to the metal with white lead or other cement. The slide valve Z may also be faced with glass or be made entirely of glass if preferred. The upper port $h'$ is extended upward, and the lower port is extended downward, as shown. These extensions give a corresponding increase to the effective area of the openings, and allow the apertures $h'$, $h^2$ in the slide H to serve effectively when the valve is in its extreme upper and lower positions. It is important that the outer faces of the apertures $h'$ $h^2$ be of only moderate width and sharply defined, and that the adjacent surfaces of the slide Z have a corresponding width with a slight excess. The excess of width of these surfaces corresponds somewhat in effect to what is known as lap in the valves of a steam engine, by allowing the slide Z to be moved to a corresponding small extent, after covering the port to arrest the induction and eduction of water before commencing to uncover it to allow the opposite conditions. Only a small amount of such lap should be allowed under ordinary conditions.

Modifications may be made without departing from the principle or sacrificing the advantages of the invention. I can omit the screws S and T, shown, for adjusting the extent to which the lever D is allowed to rise and sink, or I can provide other means for controlling such motion and consequently the extent to which the diaphragm may be flexed under the variations of pressure to which it is subject. I can provide other means than the hand-wheel P' and screw P for firmly holding down the lever D and its connections to induce the piston L to rise to its extreme highest position when it is required to close the damper and hold it tightly closed. I can provide other forms of pivots than the knife-edges shown. Knife-edges are preferable as being able to carry a large amount of strain and allow a rocking motion with very little frictional resistance. I can arrange the knife-edges so as to bring the several centers in each lever in a straight line, or can carry them a little beyond such line, so as to increase the disposition of the levers to stand in their middle positions. It is preferable to so arrange those centers as to give a tendency to such middle position; so that if the excess or diminution of pressure on the diaphragm B is only a little to induce only a slight motion of the levers, and if the excess or deficiency of pressure is greater to induce a further change of position of the parts. These details and many others, such as the packing of the piston and of the stuffing boxes to make a tight fit without inducing severe friction, will be readily understood by a skilled mechanic. I consider a piston and a diaphragm as substantial equivalents.

I claim as my invention—

1. In a damper regulator having a loaded diaphragm B, and a piston L, and suitable casing or cylinder for each, the valve casing $A^5$ with provisions $J^3$ $J^4$ for the induction and eduction of fluid under pressure, the slide-valve H, apertured as shown and the throated slide-valve Z overriding the same, both adapted to rise or retreat from the seat when required, pipes $J'$ $J^2$ to allow the fluid from such valve casing to act on the piston and connections from the diaphragm B to operate the valve H connections from the piston L to operate the valve Z and the damper, all combined and arranged for joint operation substantially as herein specified.

2. In a damper regulator in combination with the piston L and cylinder K and connections therefrom to the damper, the slide valves H and Z, fitting together and to the seat, each urged into contact with its seat by the pressure of the fluid on sufficient unbalanced surfaces, and provisions as the yielding rods $Z'$, $H'$, and knuckles $z$, $h^3$ for allowing both valves to leave the seat when required, and the diaphragm B and connections therefrom for actuating these valves, all substantially as herein specified.

3. In a damper regulator, having valves H and Z, with provisions for operating them by slight variations in the boiler pressure, the valve-casing $A^5$, and the glass seat I therein having ports $i'$, $i^2$, arranged to form the face on which the valves work, all combined substantially as herein specified.

In testimony that I claim the invention above set forth I affix my signature in presence of two witnesses.

ROYAL D. TOMLINSON.

Witnesses:
CHARLES R. SEARLE,
M. F. BOYLE.